(12) United States Patent
Hendrickson et al.

(10) Patent No.: US 6,328,552 B1
(45) Date of Patent: Dec. 11, 2001

(54) INJECTION MOLDING MACHINE AND METHOD

(75) Inventors: Glen D. Hendrickson, Amboy; Lloyd Booth, Woodland; Larry R. Sarkinen, Brush Prairie, all of WA (US)

(73) Assignee: WBNL DBA AIMMCO, Vancouver, WA (US)

( * ) Notice: Subject to any disclaimer, the term of this patent is extended or adjusted under 35 U.S.C. 154(b) by 0 days.

(21) Appl. No.: 09/378,650

(22) Filed: Aug. 20, 1999

(51) Int. Cl.⁷ ............................ B29C 33/00; B29C 33/04; B29C 45/17; B29C 45/40
(52) U.S. Cl. ............................ 425/188; 249/79; 249/102; 425/190; 425/192 R; 425/547; 425/556
(58) Field of Search ................................ 425/190, 192 R, 425/188, 547, 556, 195; 264/334; 249/79, 102

(56) References Cited

U.S. PATENT DOCUMENTS

| | | | | |
|---|---|---|---|---|
| 2,106,614 | * | 1/1938 | Lindner | 249/82 |
| 4,767,302 | * | 8/1988 | Okamoto et al. | 425/190 |
| 4,793,785 | * | 12/1988 | Osada | 425/116 |
| 4,828,479 | * | 5/1989 | Pleasant | 425/192 R |
| 4,861,254 | * | 8/1989 | Takeuchi et al. | 425/190 |
| 4,959,002 | * | 9/1990 | Pleasant | 425/192 R |
| 5,439,368 | * | 8/1995 | Martin | 425/190 |
| 5,451,156 | * | 9/1995 | Roncelli et al. | 425/192 R |
| 5,480,296 | * | 1/1996 | Jang | 425/116 |
| 5,662,946 | * | 9/1997 | Pratt et al. | 425/190 |
| 5,882,695 | * | 3/1999 | Starkey | 425/168 |

OTHER PUBLICATIONS

Brochure from Pleasant Precision, Inc. for D–M–E Round Mate, Jul. 15, 1999.

* cited by examiner

*Primary Examiner*—Nam Nguyen
*Assistant Examiner*—Emmanuel Luk
(74) *Attorney, Agent, or Firm*—Robert L. Harrington

(57) ABSTRACT

A generic mold base for an injection molding machine to permit the production of multiple parts from the same mold base. The mold base has mold insert receiving sections in which the mold insert sections are removably mounted. The mold insert sections are held in position by tapered wedges. Multiple sprue openings are provided in the upper mold base section to accommodate different mold insert designs. Accessability openings are provided in each mold base section to accommodate different water passage designs of different mold inserts.

14 Claims, 11 Drawing Sheets

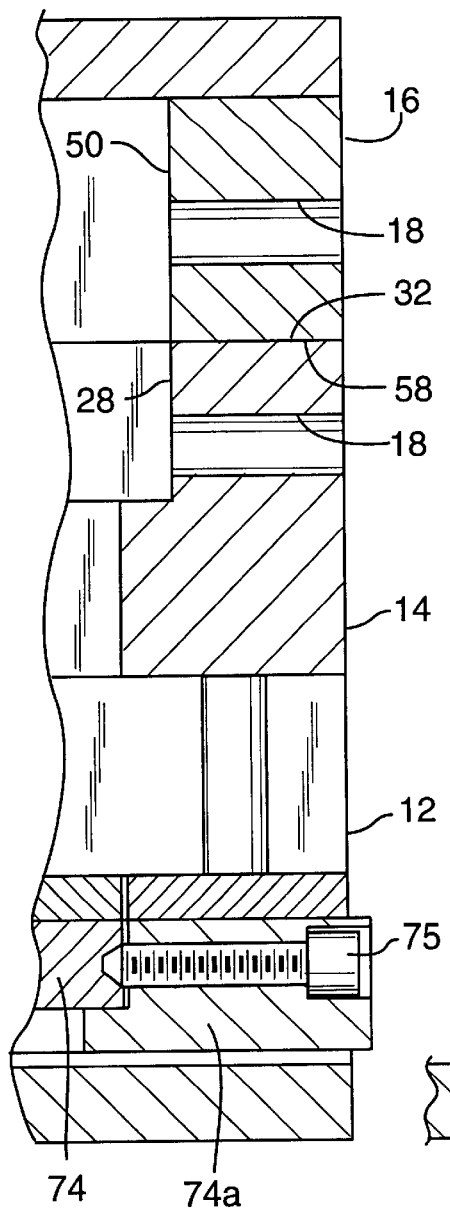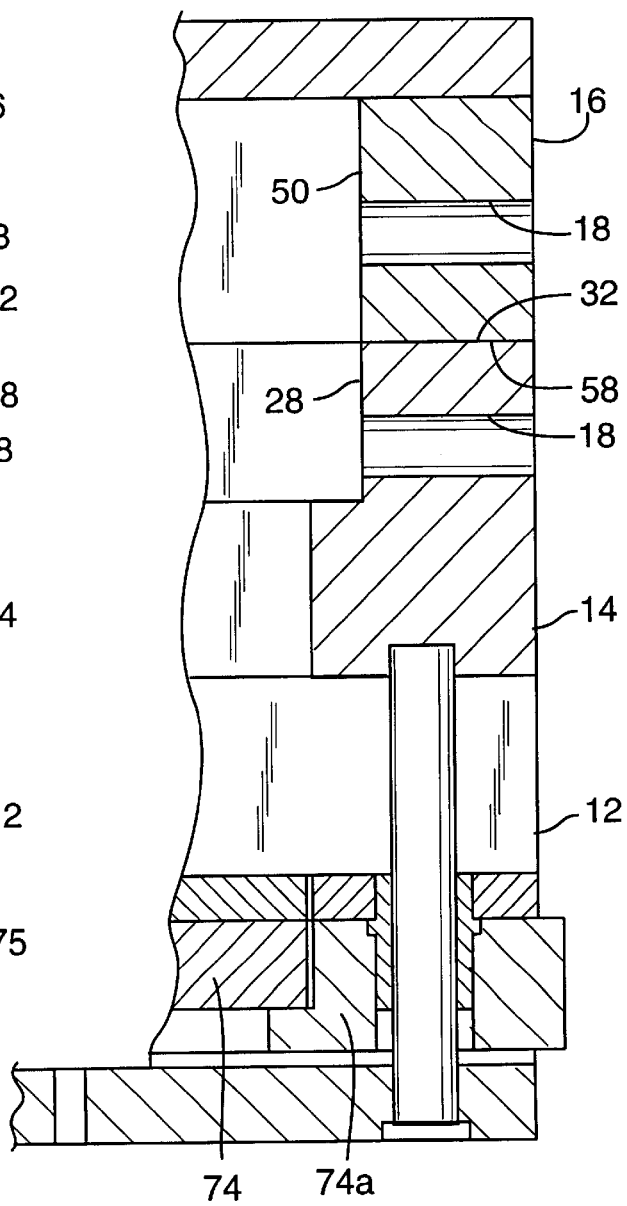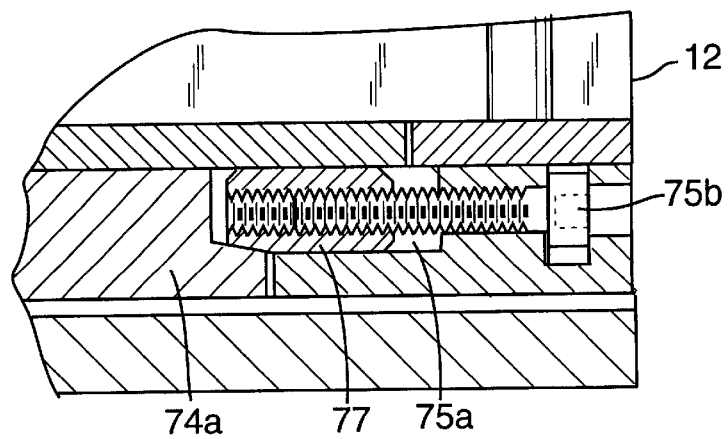

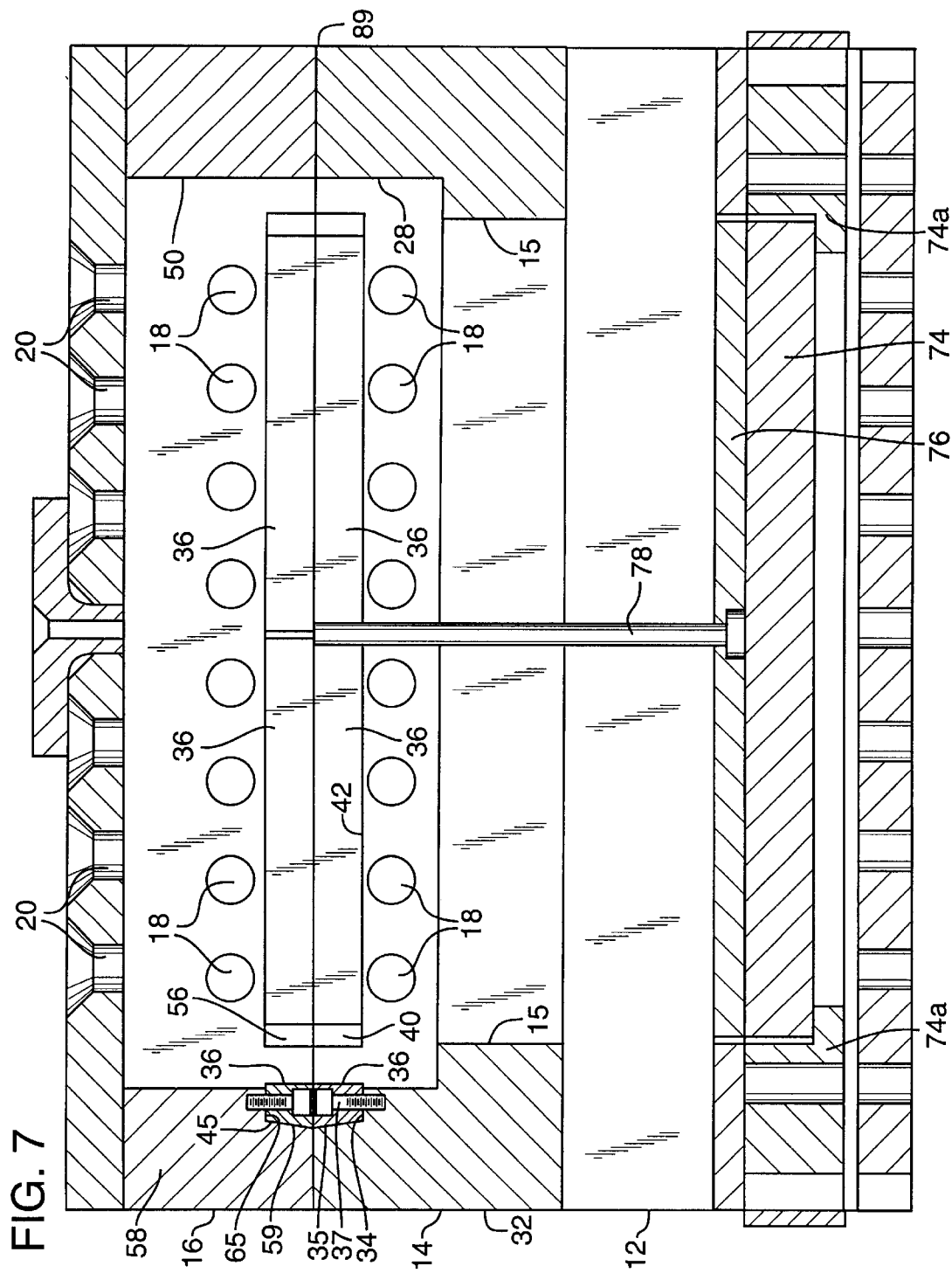

INJECTION MOLDING MACHINE AND METHOD

FIELD OF THE INVENTION

This invention relates to injection molding and more particularly to a structure and method enabling a mold base to be alternately used for different parts production.

BACKGROUND OF THE INVENTION

Injection molding of parts, e.g., produced from plastic, involves the use of a press and a mold. In accordance with the present invention, the mold is a block having mated top and bottom sections referred to as a mold base. The mold base is provided with a pocket, part of which is in each of the top and bottom sections for receiving mold inserts, also in two-part top and bottom sections, in which a cavity is cooperatively formed to define a part to be molded. The mold base also includes a sprue that receives molten plastic and conveys the molten plastic to an inter-connected passage in the mold insert that leads to the cavity. Other ports or openings in the base provide access for connection of cooling water fittings secured to passages in the insert to cool the molten plastic in the cavity. Following the cooling and thus the setting of the plastic, the two sections of the mold base are separated (the plastic part residing in the bottom section of the mold insert which resides in the bottom section of the mold base). Ejector pins are extended from the mold base and through the mold insert to engage and unseat the plastic part. The plastic part having been removed from the cavity, the ejector pins are then reseated with the reseating of the two sections of the mold base. The cycle is then repeated.

The locations of the ports (for connection to the molten plastic and water) and the ejector pins are optimally located for the particular part being molded. As will be appreciated, such ports and ejector pin locations require cooperative design as between the mold base and mold insert. Thus, it has been customary that for every part that is to be produced, a mold base and mold insert therefore is custom designed and that mold base and mold insert is dedicated to the production of that part only.

BRIEF DESCRIPTION OF THE INVENTION

It has been determined that a substantial savings can be achieved if a mold base could be adapted to receive alternate mold inserts for different parts. It is, accordingly, an objective of the present invention to provide a generic mold base with a variation of ports or openings (for both water cooling and plastic injection) and having the capacity to provide different patterns of ejector pins.

Also, because the mold inserts have to be precisely seated in the pocket of the mold base, they have been precision sized and essentially press fit into the pocket of the mold base. This inhibits removal and interchange of the mold inserts and thus a further objective is to provide a design that enables precise seating of the mold inserts in the pocket but also ready removal thereof.

A further problem results in the use of alternate mold inserts in a common mold base. The ejector pins need to be fully retracted back to molding position following ejection of each part. The ejector pins are carried by a pusher plate and the plate is moved upwardly in its own chamber in the mold base beneath the mold insert. Return of the ejector pins is accomplished by the reseating of the two mold base sections. Return pins carried by the pusher plate protrude upwardly from the bottom section of the mold base and when the mold base sections are reseated, the top section engages the return pins and pushes the pusher plate to its retracted position as well as the ejector pins carried thereby.

However, the two mold base sections are not designed to be abutted one against the other. For reasons which are not pertinent to an explanation of this invention, the part line spacing between the seated mold base sections will vary. Thus, in one case the ejector pins will be retracted a different distance than the other. This can cause damage to the pins (and failure of the part) and thus it is a further objective to provide full retraction of the pusher plate and thus the ejector pins regardless of the part line spacing.

In a preferred embodiment wherein all of the above objectives are satisfied:

(a) The mold base is provided with ports or openings that adapt to different configurations of the water cooling passages in the mold inserts and multiple sprue openings that selectively connect to anticipated infeed passages in the inserts for directing molten plastic to the cavities.

(b) The mold inserts are designed to have a designated side edge and a designated end edge that is to be securely abutted against a corresponding side edge and end edge of the pocket in the mold base. The insert may be provided so that it can only fit in the pocket in this relationship with the mold base. A relief (spacing) is provided at the opposing end and side edges of the mold insert and wedge members fitting the relief are seated between the mold insert and corresponding end and side edges of the pocket. Screws are provided to force the wedges into the corresponding relief areas and then screws are screwed through the insert into the mold base to secure an accurate positioning of the mold insert in the pocket. Removal of the mold inserts is enabled by removing the screws, allowing for removal of the wedges and then the mold inserts.

(c) The pusher plate is typically provided in upper and lower plate segments. The upper segment carries the ejector pin holes that receives the pin and pin heads. The lower plate segment is secured to the upper plate segment and traps the ejector pins to hold them in place. The mold base is provided with a peripheral seat or land for supporting the mold inserts and define a center opening through which the ejector pins protrude into the inserts. The ejector pins can be located wherever desired within the confinement of the center opening. The pusher plate is configured to fit through the opening and thus can be removed and exchanged to provide different ejector pin arrangements with removal and exchange of the mold inserts. Whereas the center of the mold insert is not supported by the mold base, strategically placed pillars are positioned to project through clearance holes in the pusher plate and into engagement with the insert to provide the needed support. The pillars are removable and replacement pillars at different locations can be provided with interchange of the mold inserts and pusher plates.

(d) The top section of the mold base is provided with pusher plate reseating pins aligned with the pusher plate return pins in the bottom section of the mold base. The upper reseating pins are spring biased to a protruded position from the bottom of the upper base section so that upon seating of the two sections of the mold base, the upper reseating pins engage the lower return pins and pushes the pins and the pusher plate to its fully retracted position. When the pusher plate is fully retracted, continued movement of the upper reseating pins is resisted and the spring behind that pins are compressed to whatever extent is required to accommodate whatever part line spacing is designed for the mold inserts.

As previously discussed, the invention provides a unique and cooperative arrangement between mold base and mold insert whereby the same mold base will accommodate a variety of mold inserts and thereby the production of different parts. This is accomplished by identifying the features that have to be customized to a specific part. Such features includes water cooling passages and ejector pin locations. The former are provided in the inserts which of course is also provided with the customized cavity. By considering the likely water cooling passage layout for a variety of part cavities, the desired locations for water connection accessibility for the variety of mold inserts can be predicted. The mold base can then be provided with the openings necessary to provide that water connection accessibility for the different inserts. The ejector pins and pusher plate are replaceable with the replacement of the mold inserts by provision of the enlarged opening in the support plate of the mold base (essentially providing a support ledge or shoulder that supports the inserts at the peripheral edge) configuring the pusher plate to be removable through the enlarged opening when the inserts are removed, and as needed, providing support pillars that are also removable through the enlarged opening.

Further, those features that are common to the different inserts are identified and provided in the mold base. Such include leader pins that guide the opening and closing of the upper and lower sections, parting line locks (which may be made adjustable if desired) and pusher plate return pins and reseating pins.

The advantages and benefits of the invention as briefly described above as well as additional benefits and advantages that will occur to those skilled in the art, will become apparent upon reference ro the following detailed description and drawings referred to therein.

BRIEF DESCRIPTION OF THE DRAWINGS

FIGS. 3A and 3B are views as viewed on view lines 3A—3A and 3B—3B respectively of FIG. 1;

FIG. 3C is a view of FIG. 3A showing an alternate structure;

FIG. 7 is a view as viewed on view lines 7—7 of FIG. 1;

DESCRIPTION OF THE PREFERRED EMBODIMENT

Figure 1:
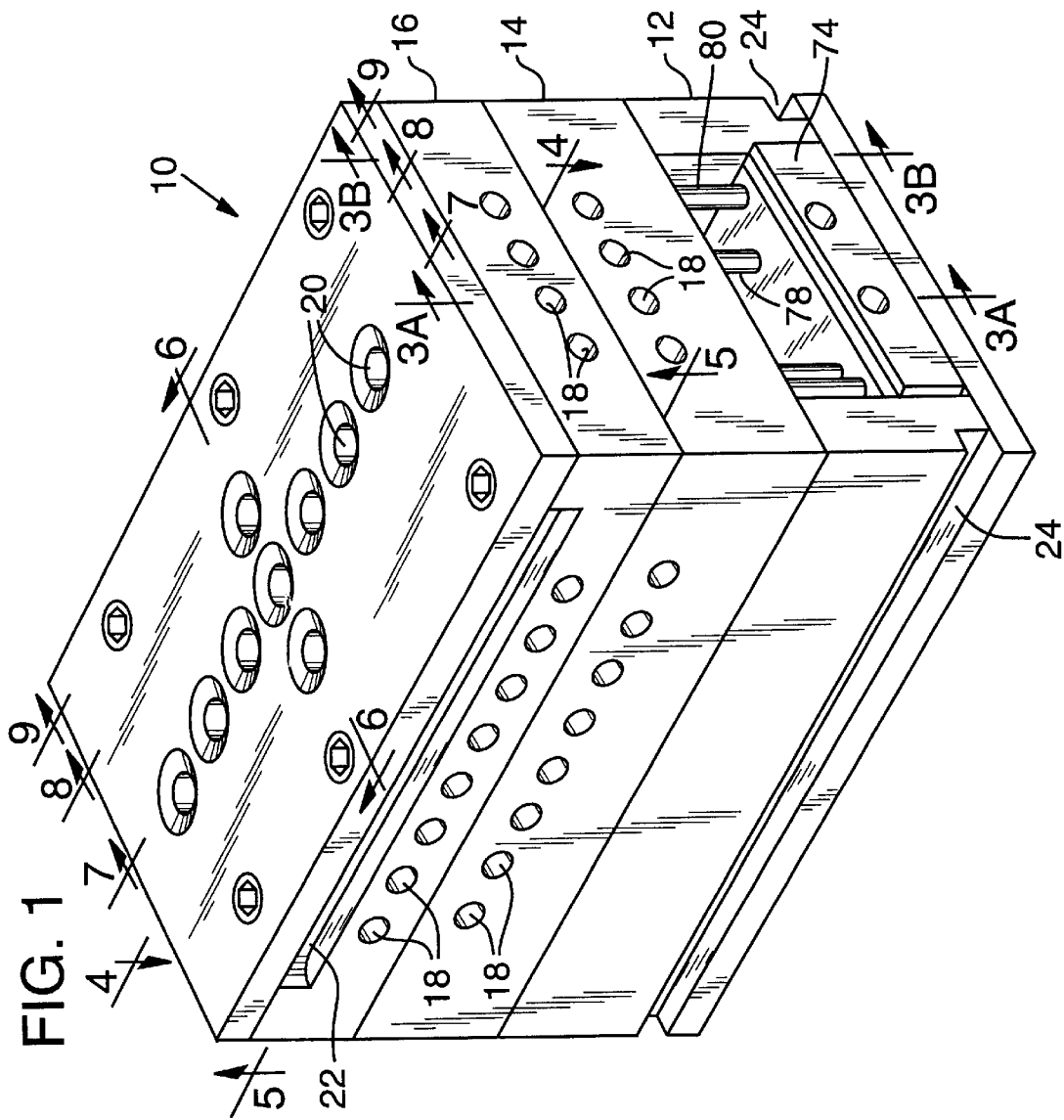
FIG. 1 is a perspective view of a mold base in accordance with this invention.
Figure 9:
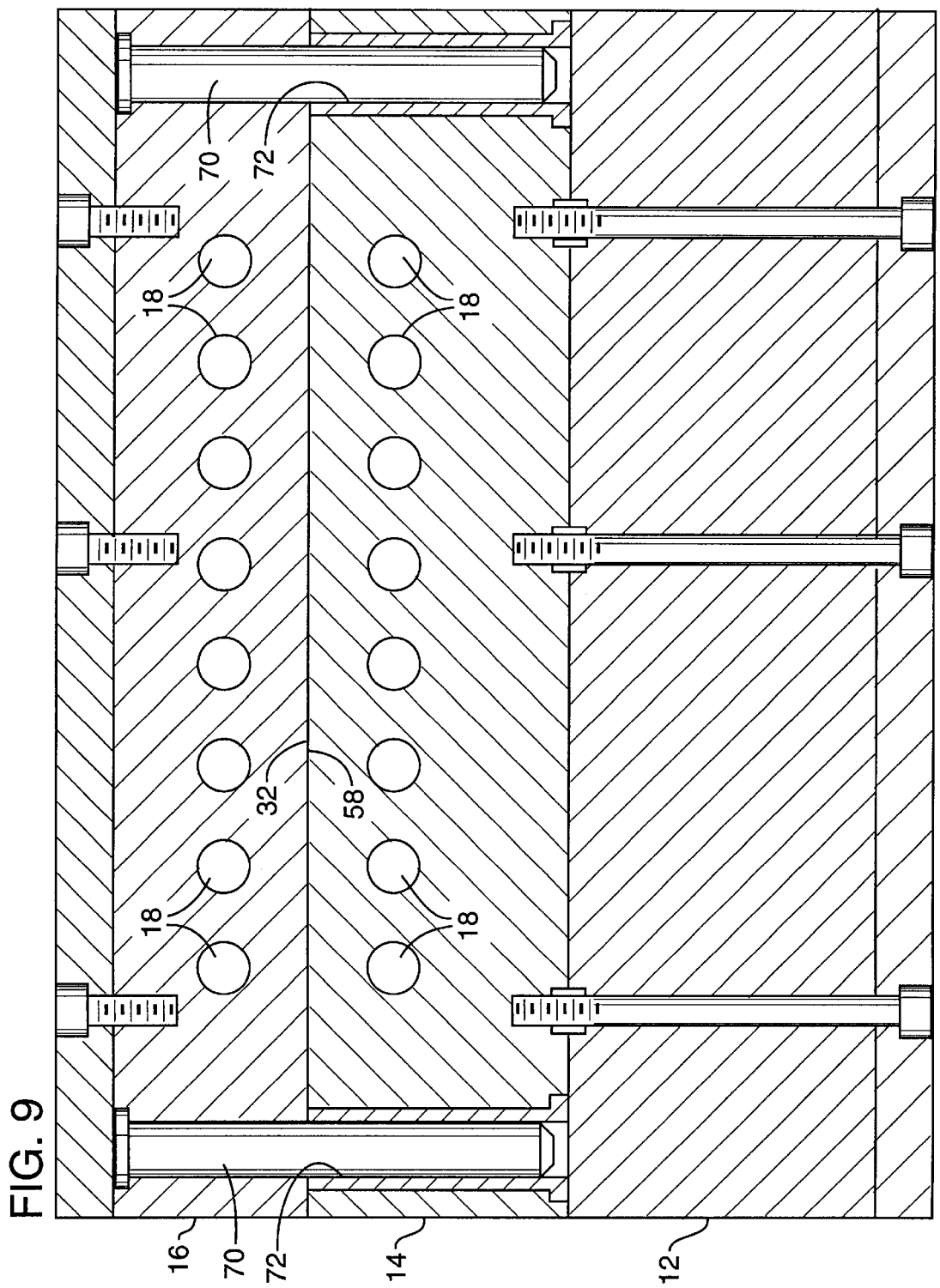
FIG. 9 is a view as viewed on view lines 9—9 of FIG. 1.

FIG. 1 illustrates a mold base 10 suited for use in an injection molding machine. The mold base 10 is a multi-layered unit having a bottom section 12 and mold insert receiving sections 14 and 16. The section 14 is removably mounted to the bottom section 12 by conventional fasteners (see FIG. 9). The mold insert receiving sections 14 and 16 will each receive one section of a mold insert. The mold insert receiving sections 14 and 16 have multiple water ports 18 that extend into the interior of the mold insert receiving sections 14 and 16. The ports 18 define openings through which cooling water lines can be connected to the insert. (Accessibility to the insert may also be provided, e.g., by elongated slots.) Passageways are provided in the mold insert sections and known connectors and tubing are inserted through ports 18 and connected to the passageways to supply cooling water in a desired pattern surrounding the insert cavity.

Figure 5:
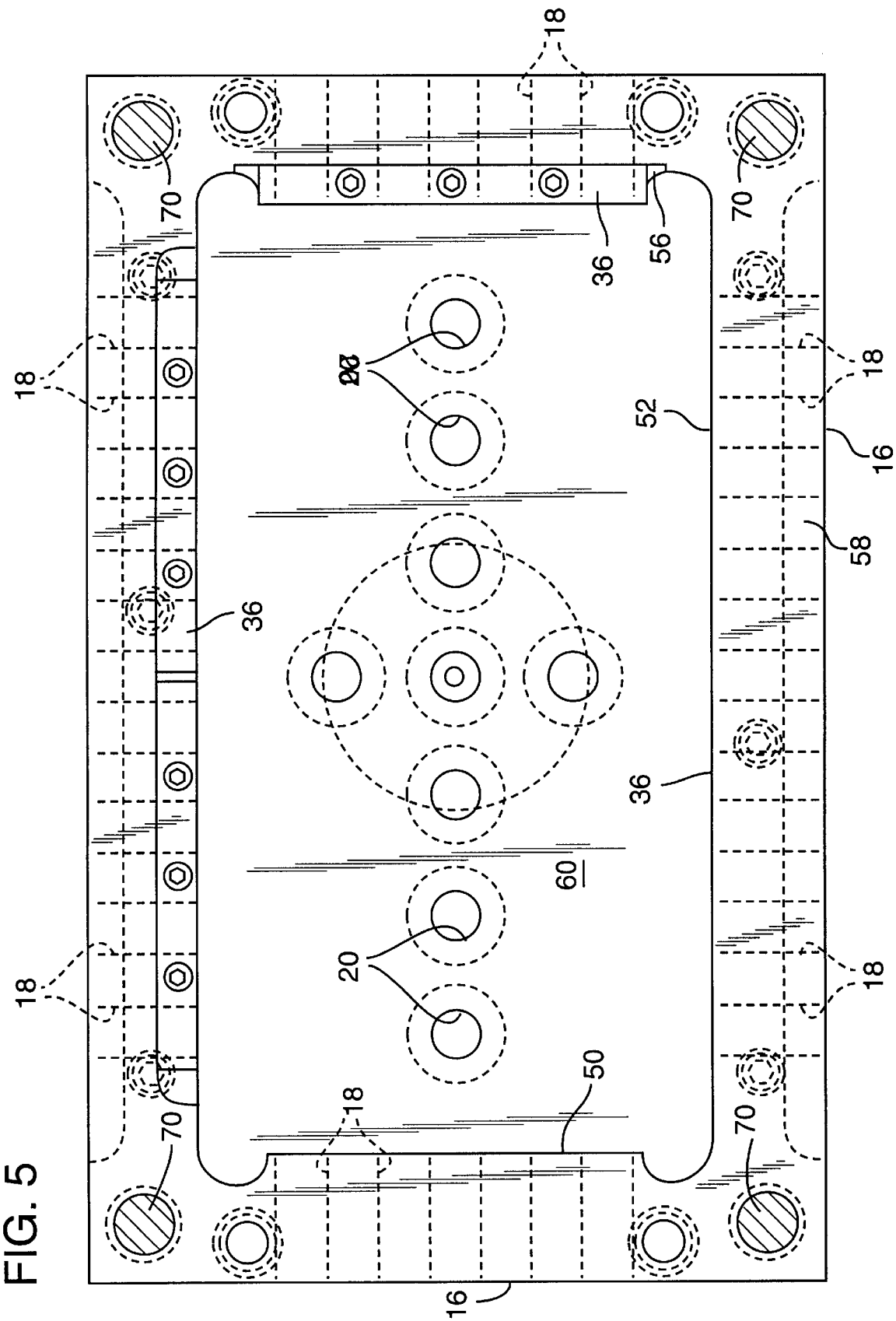
FIG. 5 is a view as viewed on view lines 5—5 of FIG. 1.

The mold insert receiving section 16 has multiple sprue openings 20 through the top of the sections with the sprue openings 20 extending to the mold inserts that reside in sections 14, 16. FIGS. 1 and 5 illustrates just one example of the sprue opening pattern that is provided in the mold base 10. One of the sprue openings 20 is selected according to the requirements of the mold insert.

As will be seen in FIG. 1, in-set slots 22 are provided in the side edges of the section 16 to mount the mold insert receiving section 16 to a platen of the press in the conventional manner. The base 12 also has a groove 24 in each of its side edges to facilitate mounting the base 12 to the opposite platen of the press.

Figure 2:
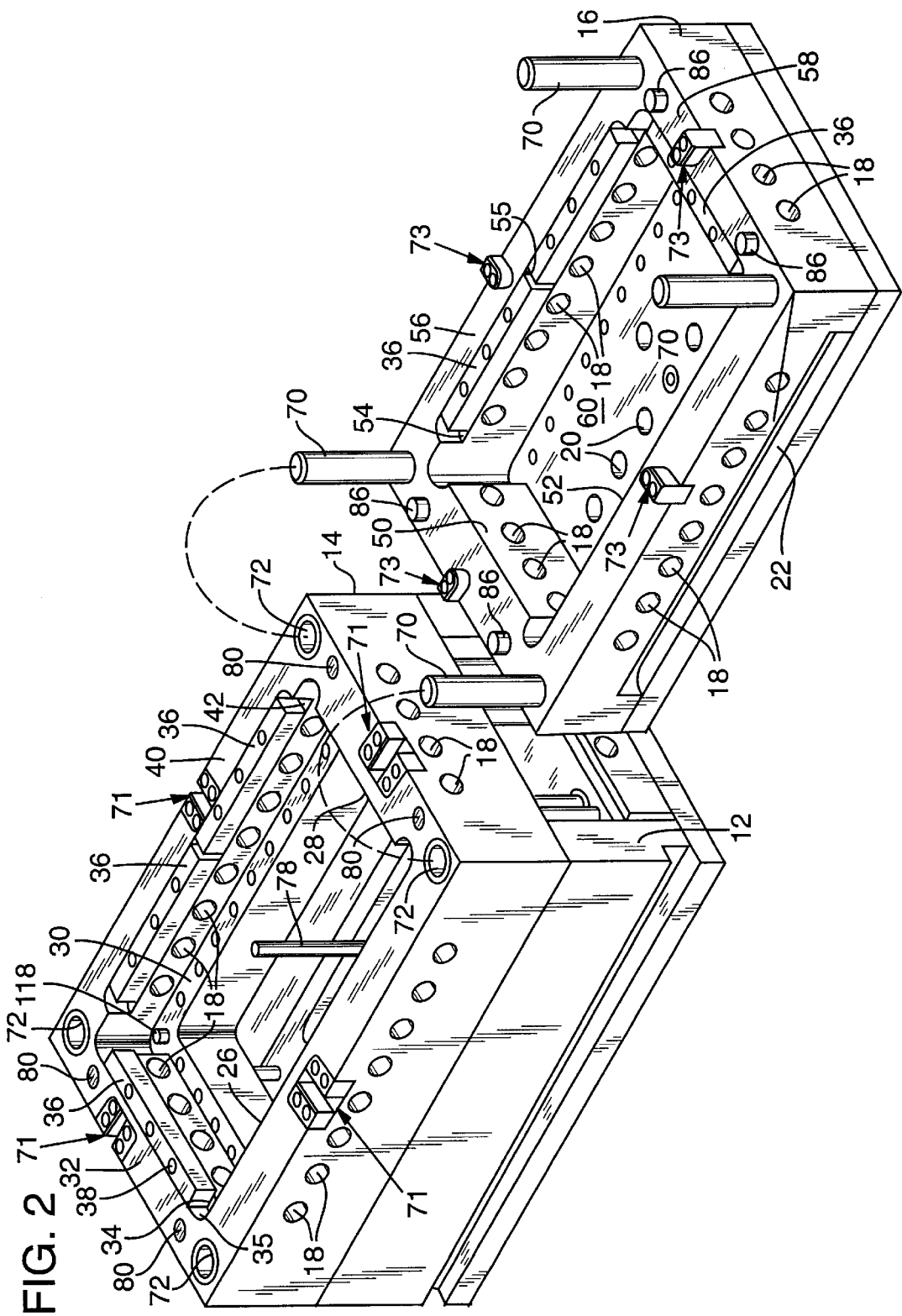
FIG. 2 is a view of the mold base of FIG. 1 but having a top section separated from a bottom section.
Figure 4:
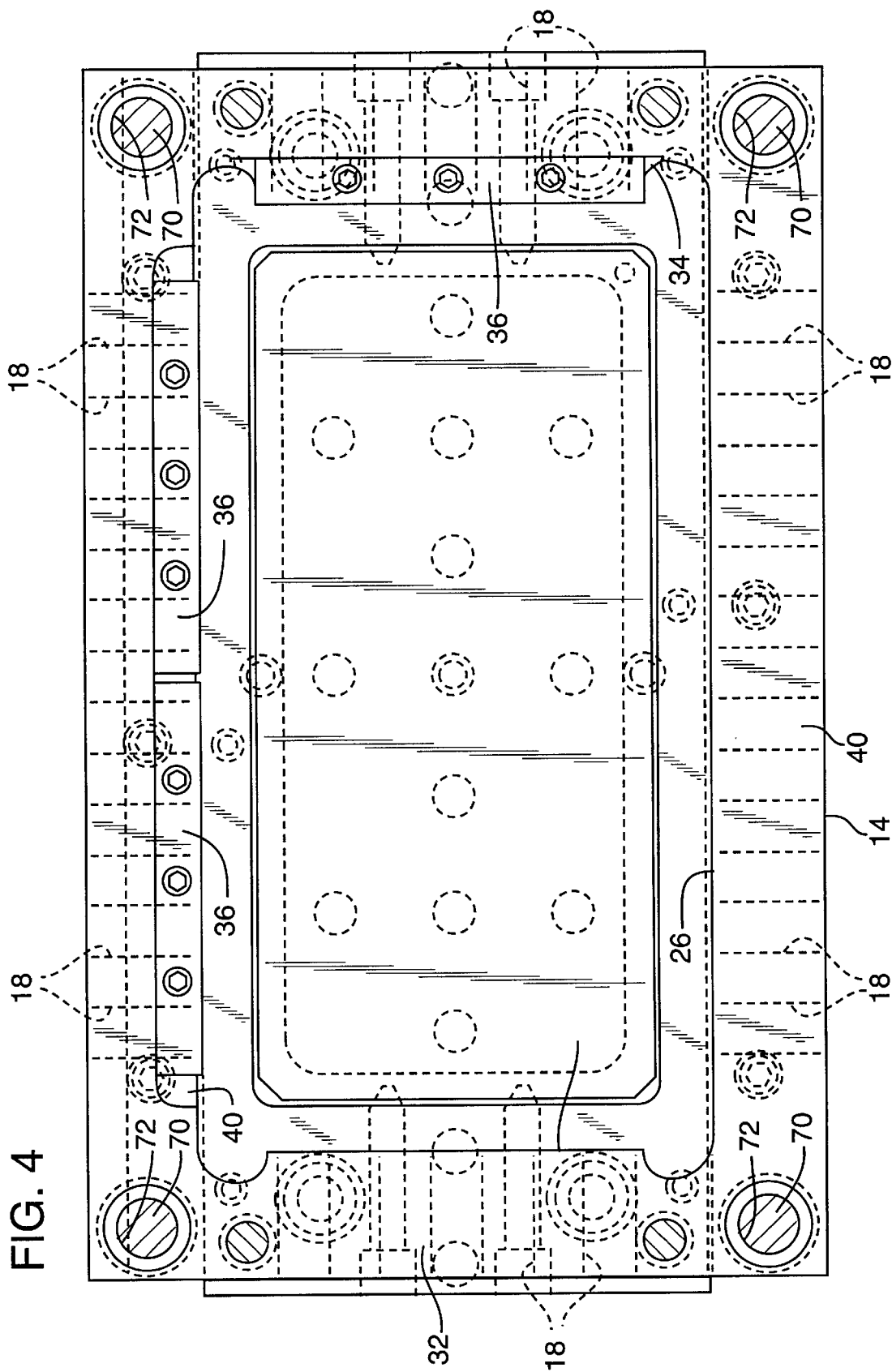
FIG. 4 is a view as viewed on view lines 4—4 of FIG. 1.

Refer now to FIG. 2 of the drawings which further illustrates the mold base 10. As shown in the figure, section 14 has a pocket with an open bottom that extends into bottom section 12. The pocket is configured to receive one portion of the formed mold insert that is utilized in the injection molding press (see FIG. 10). One side edge 26 and one end edge 28 of the interior of the base section 14 is precision machined to receive a section of the mold insert that has correspondingly precision machined side and end faces.

Figure 6:
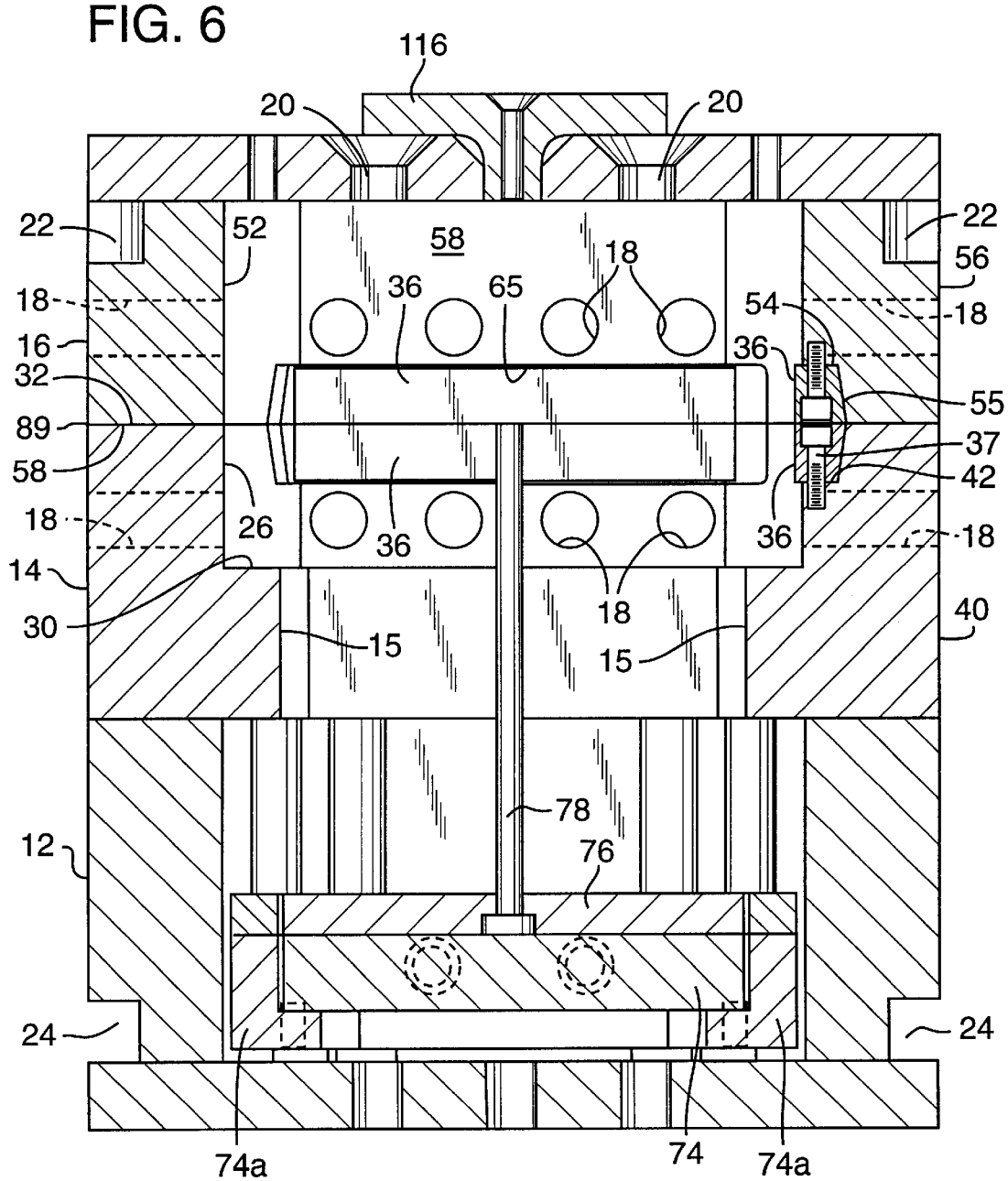
FIG. 6 is a view as viewed on view lines 6—6 of FIG. 1.
Figure 6A:
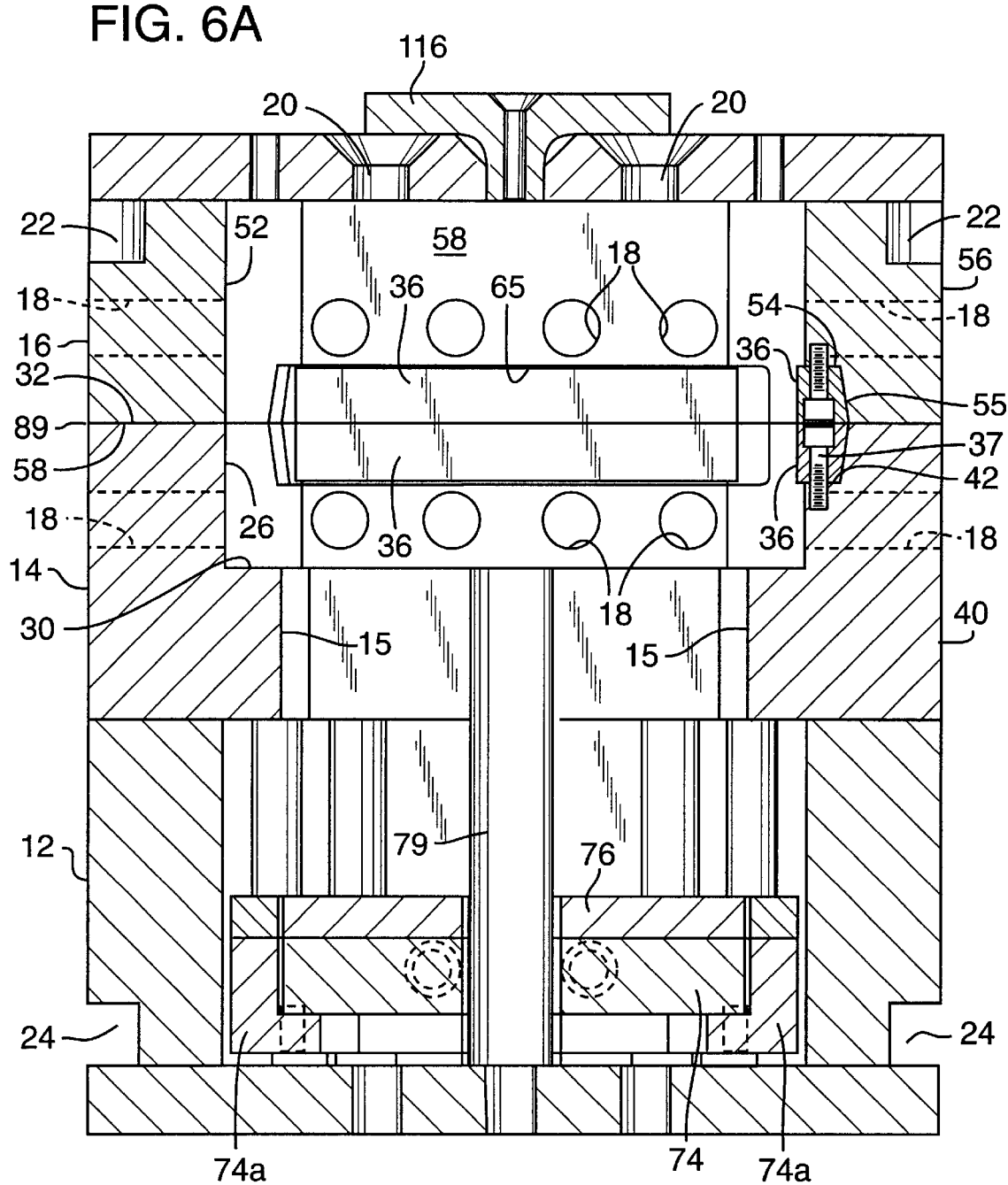
FIG. 6A is a view similar to FIG. 6 showing an alternate structure.

The portion of the mold insert that is received in the section 14 will be supported by the land 30 which defines opening 15, e.g., see FIG. 6A. The mold insert section will be forced against the machine edges 26 and 28 to accurately position the mold insert section within the mold base insert receiving section 14. An end wall 32 of the section 14 has a formed shoulder 34 that is sized to receive a tapered wedge 36. The face 35 above the shoulder 34 is machined with a slight taper (FIG. 7). Conventional drilled and tapped holes are provided in the shoulder 34. The tapered wedge 36 has bores that are alignable with the tapped bores in the shoulder 34. Conventional fasteners, such as bolts 37 are utilized to secure the tapered wedge 36 to the shoulder 34. As shown, additional wedges 36 are provided at side wall 40 of the section 14. A shoulder 42 (see also FIG. 6) is formed along a length of the side wall 40 in the same manner as the shoulder 34 is provided on the end wall 32. A face 55 above the shoulder 42 is machined with a slight taper in the same manner as the face 35 above the shoulder 34. The portion of the mold insert that is to be received in the section 14 is seated against the machined surfaces 26 and 28 to establish a positional register. The wedges 36 are then inserted against the opposite side and end faces of the mold base section 14. The wedges are installed and forced downwardly by the fasteners 37 and similar fasteners are installed directly through the insert and into the land 30 to secure the mold insert section in position.

The same mounting arrangement is incorporated in the section 16 of the mold base 10. An end wall 50 of the mold base section 16 and a side wall 52 of the interior of the mold base section 16 are precision machined in the same manner as the end 28 and the side 26 of the section 14. A shoulder 54 is formed in the side wall 56 and a shoulder 65 is formed on the end 58 of the section 16. The face 55 of the shoulder 54 (FIG. 6) is machined with a slight taper and the face 59 of the shoulder 65 on end 58 (FIG. 7) is machined with a slight taper. The shoulder 54 has conventional bored and tapped holes to facilitate mounting the tapered wedges 36. The portion of the mold insert received in the section 16 is fitted against the end wall 50 and the side 52. The mold insert section will be seated against the underside surface 60 of the top of the section 16 (see FIG. 2). The wedges 36 engaging the tapered faces (55 and 59) are forced into abutment with the mold insert received within the section 16 and screws are inserted to secure the mold insert within the section 16.

To remove the mold insert from the mold base sections 14, 16, the screws are removed and then the tapered wedges 36 are removed which allows removal of the mold insert sections from the mold base sections 14, 16.

Leader or guide pins 70 (see FIG. 2) are provided on the section 16 and they are matable with bores 72 in the section 14. The guide pins 70 will generally align the sections 16 with the section 14 as the injection molding press moves the sections 14 and 16 toward and away from each other. Parting line locks 71, 73 are provided on the four inter-engaging edge faces of the sections 14 and 16. They seat together to precisely position the two sections together. Locks 73 may be made adjustable to accommodate variations in the parting line gap.

A pusher plate 74 (best seen in FIGS. 1 and 6) is movably mounted in the base 12. An ejector pin carrier plate 76 is removably mounted to the pusher plate 74 by known methods and moves with the pusher plate 74. The carrier plate 76 is machined in conjunction with the mold insert to position ejector pins 78 at the proper location with respect to the mold insert.

As known, the distal ends of pins 78 extend into the insert through openings and form a part of the cavity wall during the molding operation. Upon completion, the pusher plate 74 is moved toward the section 14 by known mechanism of the press when the mold base sections 14 and 16 are separated. The ejector pins 78 (only one of which is shown) engage the molded part to eject the part from the mold insert.

Figure 8:
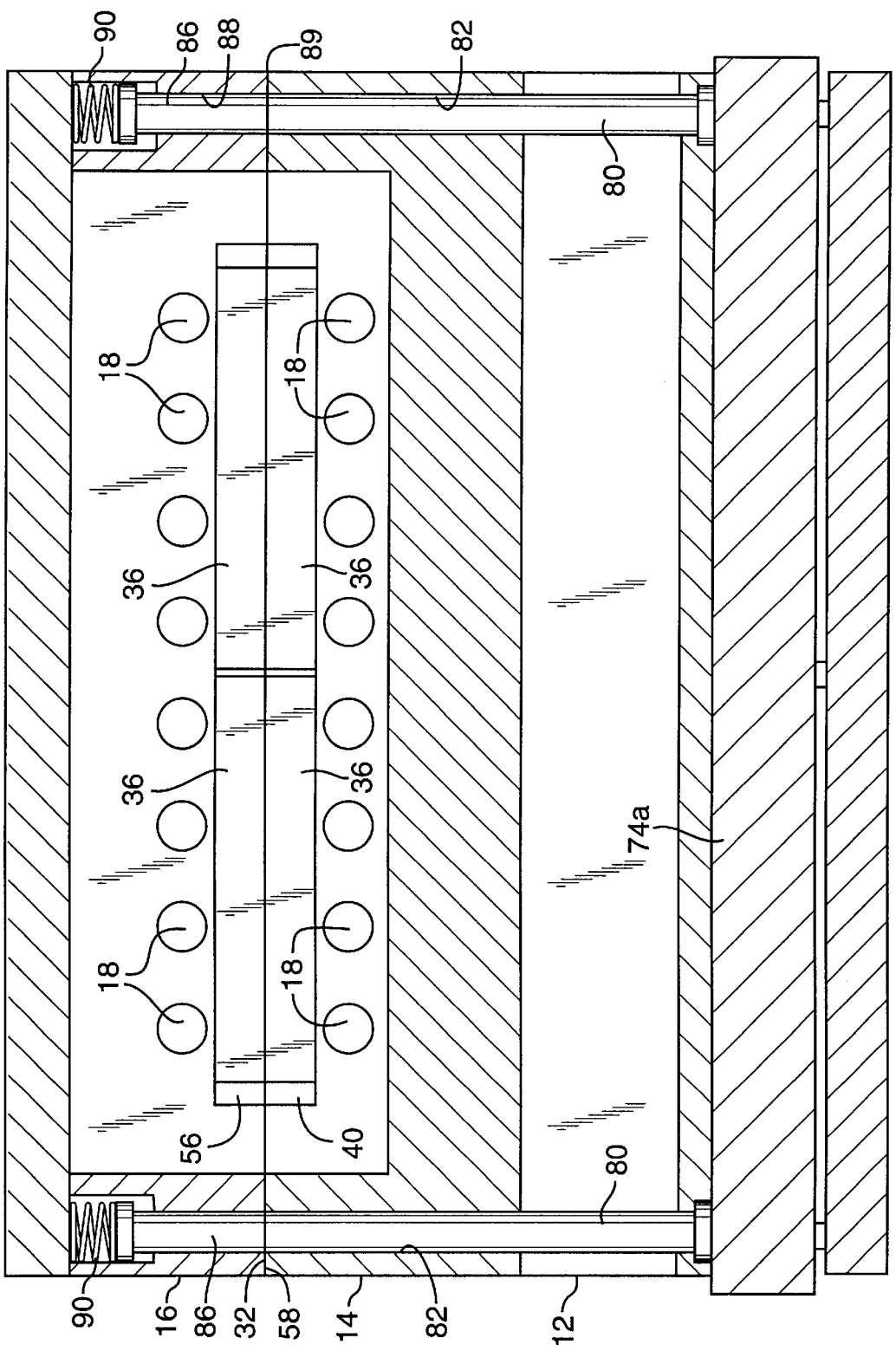
FIG. 8 is a view as viewed on view lines 8—8 of FIG. 1.

With reference to FIGS. 2 and 8, return pins 80 (which are mounted to the assembly of the pusher plate 74) are movably mounted in bores 82 in section 14. When the sections 14 and 16 are separated and the pusher plate 74 is moved through the section 14 for ejection of the molded part, the return pins 80 will project through the section 14 (but shown in a retracted position in FIG. 2). Reseating pins 86 are provided in bores 88 in the section 16 that are aligned with the return pins 80. The reseating pins 86 have biasing springs 90 (FIG. 8) that urge the pins 86 to move out of the bores 88. When the press forces the mold base sections 14 and 16 (and thus the mold insert sections) together, the pins 86 will engage the pins 80 to force the pusher plate toward the bottom of the base 12. The pins 86 being biased by springs 90 insure that the pusher plate 74 will be returned to its home position even though the part line 89 may provide a varied separation between the mold base sections 14 and 16 (see FIG. 8).

It will be appreciated from the foregoing that the generic mold base will accommodate different mold inserts having a common exterior dimension. Different mold inserts even of the same exterior size, because they produce different parts, will require different cooling ports and different molten plastic port arrangements. Further they will require different ejector pin arrangements.

The openings 18 and sprue ports 20 for the generic mold base will accommodate a wide range of part production. Only the sprue opening 20 that is aligned with entryway of the mold insert through which the molten plastic material is injected is utilized. It is contemplated, however, that cooperative design of the mold base and inserts will permit some variation in cavity design (and part production) using a single sprue port in the mold base. The water lines for the inserts are connected to the water passages of the inserts through whichever of the ports or openings 18 that provides accessibility to the water passages.

Rearrangement of the ejector pins is accomplished by the pusher plate assembly design as illustrated in FIGS. 6, 7 and 3A/3C. The plate 74 is secured to a plate frame 74A by screw members 75 inserted into a relief in the plate 74. Screw members 75 are accessible from the exterior as illustrated in FIG. 3A. The screw members 75 are backed out of the plate 74 and as will be noted in FIGS. 6 and 7, the assembly of plate 74, carrier plate 76 and pins 78 (but minus frame 74A) can be withdrawn through opening 15 after the sections 14 and 16 are separated and the mold insert is removed from the pocket of section 14. FIG. 3C shows a variation of screw member 75 to avoid having to back the screw member away from the mold base. A ferrule 75A is moved into and out of the relief and screw member 75B moves the ferrule in and out. (A similar screw arrangement may be provided for adjustment of the parting line locks 73.)

Whereas the openings 15 defined by support lands 30 reduce the support for the bottom mold insert as compared to prior mold bases that provide a continuous support, to reinforce such support as desired, one or more support pillars 79 may be provided (see FIG. 6A). The pillars 79 extend from the bottom plate of the mold base to a position underlying the mold insert as illustrated in FIG. 6A. The pillars do not move up and down with the pusher plate assembly and a clearance hole or opening is provided in the pusher plate to allow the pusher plate to slide up and down around the pillars. The pillars are, however, removable with the pusher plate through opening 15 and the positions of the pillars are rearranged as required to accommodate different positions of the ejector pins 78 (see FIG. 6).

As previously discussed and as illustrated in FIG. 8, whereas different mold insert designs are provided with different part lines 89, such is accommodated by the return pin arrangement whereby reseating pin 86 in combination with spring 90 assures the full seating of the return pins 80 (and pusher plate 74 and ejector pin 78).

Figure 10:
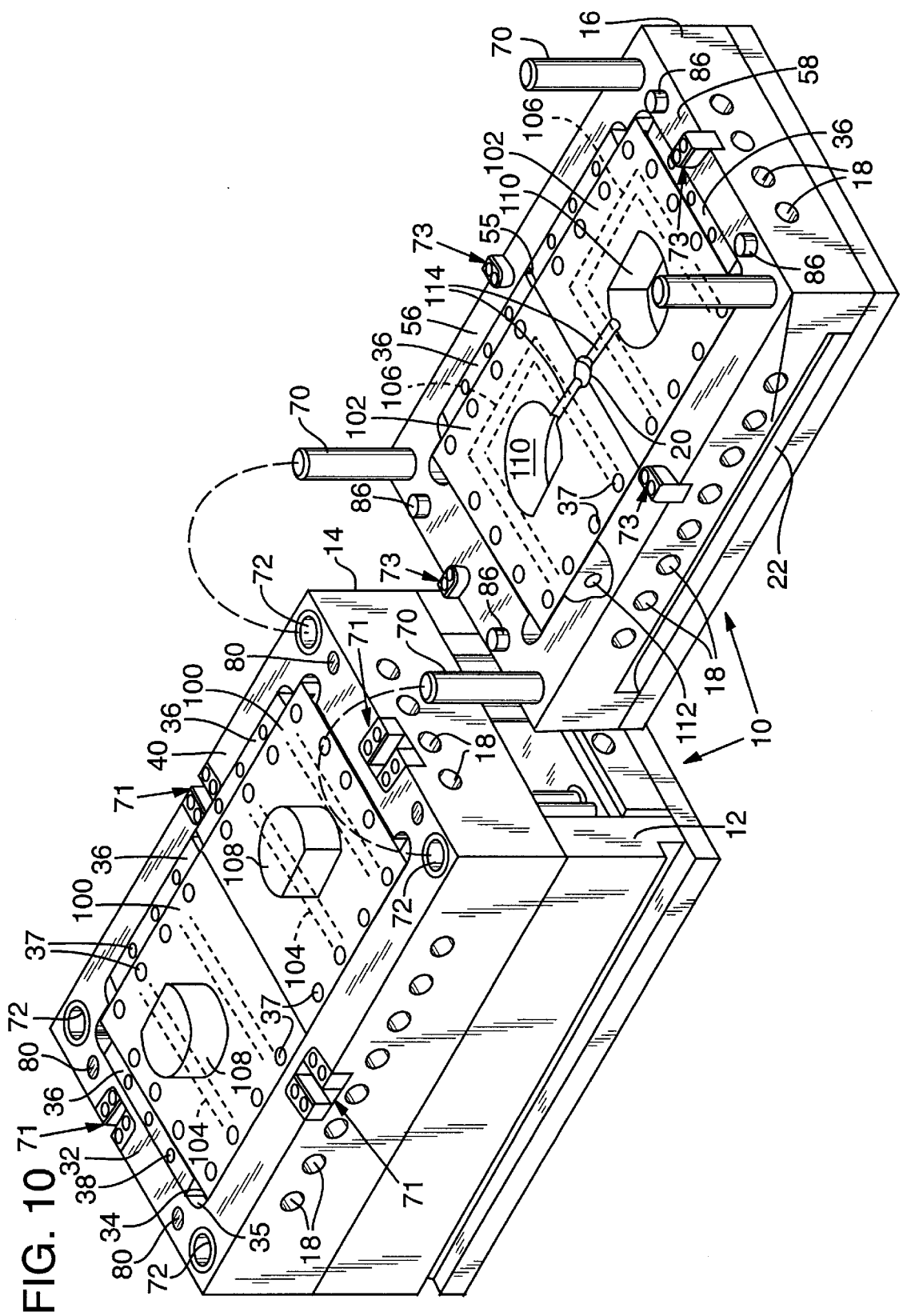
FIG. 10 is a view similar to FIG. 2 but illustrates mold inserts seated in the pockets of the mold base.

With specific reference to FIG. 10, a mold base 10 incorporating the present invention can be readily adapted to receive different mold inserts 100, 102. The mold inserts are readily removed as provided by the wedge seating arrangement. The screws 37 are removed and then the wedges 36. This releases the inserts 100, 102 which are then removed. Screw members 75 (or 75B) are retracted to release the pusher plate, carrier plate and ejector pins from frame 74A and they are then removed through opening 15. A replacement pusher plate assembly and mold insert are mounted in the mold base and secured by the screw members 75 and wedges 36, respectively.

The mold base is adjustable on the press to align the injection nozzle with the designated sprue opening (but only if the system requires multiple sprue openings) and the water line connections are connected through opening 18 and into the designated water ports in the mold insert. The machine is then ready to make the new parts.

The mold inserts are most clearly illustrated in FIG. 10. These inserts are prepared substantially as previously known except for the following. The water lines indicated as dash lines 104, 106 are established to provide the desired flow of cooling water around the molding cavity (formed by the mated segments 108, 110 in the top and bottom mold inserts 100, 102) with ports 112 (only one being shown) aligned with any of the accessibility openings 18. Dash lines 114 represent passages in the insert connected to a sprue 20 which in turn is connected to a sprue bushing 116 indicated in FIG. 6. Of particular importance is the alignment of the appropriate end and side edges of the inserts with the appropriate end and side edges of the mold base as described heretofore. Any of several means can be adopted to insure proper mounting. Referring to FIG. 2, a dowel 118 is provided to mate with a receiving hole (not shown) in the mold insert with prevents any error in mounting (as long as the dowel receiving opening is properly positioned by the insert manufacturer).

Those skilled in the art will recognize that numerous modifications and variations may be made without departing from the true spirit and scope of the invention. The invention is therefore not to be limited to the embodiments described and illustrated but is to be determined from the appended claims.

What is claimed is:

1. A system for molding plastic parts comprising:
    a mold base having top and bottom sections cooperatively defining a mold base exterior and a mold base interior cavity including mated top and bottom insert receiving pockets;
    a plurality of mold inserts having top and bottom sections removably and replaceably fitted to the insert receiving pockets, said mold inserts defining mated top and bottom mold cavities for modling at least one specified part;
    said mold base configured to interchangeably receive different mold inserts for molding different parts, said different mold inserts having different cooling water passages and different and pre-determined locations of exterior ports leading to said passages, said mold base exterior configured to provide accessibility to any of said exterior ports of said different mold inserts leading to said water cooling passages.

2. A system as defined in claim 1 wherein:
    a pusher plate assembly including ejector pins are movably mounted in the bottom section of the mold base, said ejector pins arranged for upward movement toward an insert therein for ejecting a specific part molded in the cavity of the insert, said assembly removable and replaceable with interchange of mold inserts.

3. A system as defined in claim 2 wherein the bottom section of the mold base includes a peripheral land on which the bottom section of the insert is supported, the land defining an opening through which ejector pins are extended to the insert.

4. A system as defined in claim 3 wherein a frame surrounds a pusher plate portion of the assembly and fasteners secure the pusher plate portion to the frame and are movable as a unit in the ejecting operation;
    said pusher plate portion sized to fit through the opening defined by the peripheral land and removable through the opening upon release of the fasteners.

5. A system as defined in claim 4 wherein return pins are mounted on the frame of the pusher plate assembly, reseating pins are aligned with the return pins and mounted to the top section of the mold base whereby separation of the top and bottom sections permits ejection of the part molded in the cavity upon upward movement of the pusher plate and closure of the top and bottom sections provides reseating of the pusher plate ejector pins and return pins.

6. A system as defined in claim 5 wherein the reseating pins are spring biased and upon full reseating of the return pins, said reseating pins are thereafter retracted against said spring bias.

7. A system as defined in claim 6 wherein a removable support pillar extends through the pusher plate and into a support position supporting the inserts exposed through the opening defined by the peripheral land, said support pillar positioned to avoid interference with the ejector pins, said support pillar removable and re-arrangeable upon interchange of the inserts and pusher plate assembly.

8. A system as defined in claim 1 wherein the pocket is defined by two opposed end walls and two opposed side walls, one end wall and one side wall being positional registry walls against which the insert is seated in a desired registry with the mold base, and the other end wall and other side wall providing relief space for insertion and removal of the inserts, and wedges removably inserted in the relief space to wedge the inserts against the positional registry walls.

9. A system as defined in claim 8 wherein male/female registry members are provided on engaging faces of the mold base and inserts requiring seating of the male/female registry members for placement of the inserts into the pocket of the mold base.

10. A system as defined in claim 1 including guide pins provided in one of the mold base sections slidably extended into the other mold base section for guiding the mold base sections together during opening and closing, a pusher plate assembly carrying ejector pins and a frame portion thereof forming a part of the bottom section of the mold base, and return pins mounted on the frame section, reseating pins mounted in the upper mold base section and aligned with the return pins for reseating the return pins and pusher plate assembly upon closing of the mold base sections, and said mold base sections having mated male/female part line locks that engage and precisely align the mold base sections upon closure.

11. A system as defined in claim 1 wherein said different mold inserts have different molten plastic passages for directing molten plastic from different and pre-determined locations of receiving ports to said different passages, said mold base further configured to direct molten plastic from said mold base exterior to any of said receiving ports.

12. A system for molding plastic parts comprising:
    a mold base having top and bottom sections defining mated top and bottom insert receiving pockets and top and bottom insert sections seated in the pockets, said insert sections defining a cavity for receiving molten plastic and producing plastic parts in accordance therewith, said mold base top and bottom sections and the corresponding insert sections having an open position with the sections separated and a closed position, said mold base top and bottom sections defining a part line between the sections;
    a slidable pusher plate mounted in the bottom section of the mold base and ejector pins carried by said pusher plate, said pusher plate having a retracted position with the top and bottom sections of the mold base and the top and bottom insert sections in the closed position, and having a protruded position for ejecting plastic parts from the cavity of the bottom of the insert section with the insert sections and mold base sections in the open position;

return pins mounted on the pusher plate and having retracted and protruded positions with positioning of the pusher plate between retracted and protruded positions; and reseating pins mounted in the top section of the mold base and aligned with the return pins of the pusher plate whereby closing of the top and bottom sections of the mold base produces engagement of the reseating pins with the return pins and retraction of the return pins and pusher plate to the retracted position;

a spring biasing member provided in the mounting of the reseating pins to permit limited retraction of the seating pins relative to the top section to accommodate variation of the part line.

13. A system for molding plastic parts comprising:

a mold base having top and bottom sections defining mated top and bottom insert receiving pockets;

a plurality of mold inserts having top and bottom sections removably and replaceably fitted to the insert receiving pockets, said mold inserts defining mated top and bottom cavities for molding at least one specified part;

said mold base defined and configured to accommodate different mold inserts for molding different parts, said different mold inserts having different passages and pre-determined different receiving ports for receiving and directing molten plastic to the passages and to the cavities therein which are customized to the part being produced, said mold base provided with multiple sprue openings cooperatively arranged to accommodate any of the pre-determined receiving ports of said mold inserts.

14. In a system for molding plastic parts wherein a mold base having top and bottom sections is provided with pockets for receiving a plurality of mold inserts, said mold base having accessible openings to provide access to water passages of the plurality inserts having various water passage designs including different and pre-determined locations of ports leading to said water passage designs;

a plurality of inserts comprising:

top and bottom sections, said sections configured and sized to fit the pockets of top and bottom sections of the mold base, means for securing said insert sections in said pockets, said means providing release and removal of said sections from said pockets and said sections having a water cooling passage design customized to a part to be produced and selected from one of said water passage designs.

* * * * *